(12) United States Patent
Jansen et al.

(10) Patent No.: US 7,830,063 B2
(45) Date of Patent: Nov. 9, 2010

(54) ELECTRICAL MACHINE WITH DOUBLE-SIDED ROTOR

(75) Inventors: Patrick Lee Jansen, Scotia, NY (US); James Michael Fogarty, Schenectady, NY (US); Ralph James Carl, Jr., Clifton Park, NY (US); James Patrick Francis Lyons, Saratoga Springs, NY (US); Ronghai Qu, Clifton Park, NY (US)

(73) Assignee: General Electric Company, Schenectady, NY (US)

( * ) Notice: Subject to any disclaimer, the term of this patent is extended or adjusted under 35 U.S.C. 154(b) by 272 days.

(21) Appl. No.: 11/559,505

(22) Filed: Nov. 14, 2006

(65) Prior Publication Data

US 2007/0281558 A1 Dec. 6, 2007

Related U.S. Application Data

(63) Continuation-in-part of application No. 10/882,911, filed on Jun. 30, 2004, now Pat. No. 7,154,191.

(51) Int. Cl.
*H02K 1/22* (2006.01)
(52) U.S. Cl. .................. 310/266; 310/112
(58) Field of Classification Search .............. 310/266, 310/112
See application file for complete search history.

(56) References Cited

U.S. PATENT DOCUMENTS

| | | | |
|---|---|---|---|
| 1,661,135 A | 2/1928 | Knight | |
| 3,023,330 A | 2/1962 | Rotors | |
| 3,148,294 A * | 9/1964 | Jaeschke | ............ 310/105 |
| 3,789,252 A | 1/1974 | Abegg | |
| 4,187,441 A | 2/1980 | Oney | |
| 4,517,484 A | 5/1985 | Dacier | |
| 4,720,640 A | 1/1988 | Anderson et al. | |
| 4,761,590 A | 8/1988 | Kaszman | |
| 4,866,321 A | 9/1989 | Blanchard et al. | |
| 4,900,965 A | 2/1990 | Fisher | |
| 5,004,944 A | 4/1991 | Fisher | |

(Continued)

FOREIGN PATENT DOCUMENTS

DE 4023791 7/1990

(Continued)

OTHER PUBLICATIONS

U.S. Appl. No. 11/559,506, filed Nov. 14, 2006, Patrick Jansen, et al.

(Continued)

*Primary Examiner*—Quyen Leung
*Assistant Examiner*—Alex W Mok
(74) *Attorney, Agent, or Firm*—GE Global Patent Operation; Roger C. Phillips; William Fitzpatrick

(57) ABSTRACT

A machine useful for ship propulsion purposes include a double-sided generator or motor with two concentric air gaps. In one embodiment, the machine includes a double-sided rotor with an inner rotor side and an outer rotor side; and a stator with an inner stator core and an outer stator core, wherein the double-sided rotor is concentrically disposed between the inner stator core and the outer stator core.

9 Claims, 7 Drawing Sheets

U.S. PATENT DOCUMENTS

| | | | |
|---|---|---|---|
| 5,081,388 A * | 1/1992 | Chen ............... 310/266 |
| 5,212,419 A * | 5/1993 | Fisher et al. ............ 310/254 |
| 5,311,092 A | 5/1994 | Fisher |
| 5,315,159 A | 5/1994 | Gribnau |
| 5,331,244 A | 7/1994 | Rabe |
| 5,334,898 A | 8/1994 | Skybyk |
| 5,625,241 A * | 4/1997 | Ewing et al. ........ 310/156.37 |
| 5,731,649 A | 3/1998 | Camaano |
| 5,751,089 A | 5/1998 | Stridsburg |
| 5,783,893 A * | 7/1998 | Dade et al. ............ 310/266 |
| 5,977,684 A | 11/1999 | Lin |
| 6,177,746 B1 | 1/2001 | Tupper et al. |
| 6,285,090 B1 | 9/2001 | Brutsaert et al. |
| 6,459,185 B1 * | 10/2002 | Ehrhart et al. ........ 310/156.45 |
| 6,462,457 B2 | 10/2002 | Shah et al. |
| 6,504,260 B1 * | 1/2003 | Debleser .................. 290/44 |
| 6,590,312 B1 | 7/2003 | Seguchi et al. |
| 6,720,688 B1 | 4/2004 | Schiller |
| 6,744,504 B2 | 6/2004 | Yokota |
| 6,762,525 B1 | 7/2004 | Maslov et al. |
| 6,774,527 B2 | 8/2004 | Furuse et al. |
| 6,794,781 B2 | 9/2004 | Razzell et al. |
| 6,794,783 B2 | 9/2004 | Tu et al. |
| 7,154,191 B2 | 12/2006 | Jansen |
| 7,154,192 B2 | 12/2006 | Jansen |
| 7,154,193 B2 | 12/2006 | Jansen |
| 2002/0047418 A1 | 4/2002 | Seguchi et al. |
| 2003/0102676 A1 | 6/2003 | Rembert |
| 2003/0193253 A1 | 10/2003 | Arimitsu et al. |
| 2003/0236036 A1 | 12/2003 | Varis |
| 2004/0041409 A1 | 3/2004 | Gabrys |
| 2004/0119373 A1 | 6/2004 | Akatsu |
| 2004/0135461 A1 | 7/2004 | Miyake et al. |
| 2004/0195929 A1 | 10/2004 | Oshidari et al. |
| 2004/0239199 A1 | 12/2004 | Qu et al. |

FOREIGN PATENT DOCUMENTS

| | | |
|---|---|---|
| DE | 4402184 | 1/1994 |
| DE | 19636591 A1 | 10/1996 |
| DE | 19643362 | 10/1996 |
| DE | 19704652 | 2/1997 |
| EP | 1375913 | 1/2004 |
| EP | 1394406 A2 | 3/2004 |
| EP | 1465326 A2 | 10/2004 |
| FR | 2823178 | 4/2001 |
| JP | 53015502 A * | 2/1978 |
| JP | 56053557 A * | 5/1981 |
| JP | 56074075 A * | 6/1981 |
| JP | 56107767 A * | 8/1981 |
| WO | WO9939426 A1 | 8/1999 |
| WO | WO 01/21956 A1 | 3/2001 |
| WO | WO 02/057624 A1 | 7/2002 |
| WO | WO 01/06623 | 1/2005 |

OTHER PUBLICATIONS

U.S. Appl. No. 11/559,509, filed Nov. 14, 2006, Patrick Jansen, et al.
Ronghai Qu, "Dual-Rotor, Radial-Flux, Toroidally Wound, Permanent-Magnet Machines", 2003 IEEE Trans on Industry Applications, vol. 39, No. 6, pp. 1665-1673.
Edward Spooner, et al, "Modular, Permanent Magnet Wind-Turbine Generators". 1996 IEEE, pp. 497-502.
EPO Search Report Dated Jan. 16, 2006.
EPO Search Report Dated Jan. 20, 2006.

* cited by examiner

ELECTRICAL MACHINE WITH DOUBLE-SIDED ROTOR

CROSS REFERENCE TO RELATED APPLICATIONS

This application is a continuation in part of U.S. patent application Ser. No. 10/882,911 filed Jun. 30, 2004, entitled "Electrical Machine With Double-Sided Rotor", now U.S. Pat. No. 7,154,191, which is herein incorporated by reference.

BACKGROUND OF THE INVENTION

The present invention relates generally to electrical machines and more specifically to wind turbine generators and ship propulsion motors.

Wind is usually considered to be a form of solar energy. Wind is caused by the uneven heating of the atmosphere by the sun, the irregularities of the earth's surface, and rotation of the earth, and wind flow patterns are modified by the earth's terrain, bodies of water, and vegetation. The terms wind energy or wind power describe the process by which the wind is used to generate mechanical power or electricity.

Typically, wind turbines are used to convert the kinetic energy in the wind into mechanical power. This mechanical power may be used for specific tasks (such as grinding grain or pumping water) or a generator may convert this mechanical power into electricity. A wind turbine usually includes an aerodynamic mechanism for converting the movement of air into a mechanical motion which is then converted with a generator into electrical power. Power output from the generator is approximately proportional to the cube of the wind speed. As wind speed doubles, the capacity of wind generators increases almost eightfold.

The majority of commercially available wind turbines utilize geared drive trains to connect the turbine blades to the wind generators. The wind turns the turbine blades, which spin a shaft, which feeds into a gear-box and then connects to a wind generator and makes electricity. The geared drive aims to increase the velocity of the mechanical motion. The drawback of a geared drive is that it reduces the reliability of the wind turbine and increases the noise and cost of the wind turbine.

A few wind turbines utilizing direct-drive generators are also commercially available. The large diameters of direct drive generators present formidable transportation and assembly challenges, both at the factories and at the wind turbine installation site. As the wind turbine industry matures and technology improves, larger power ratings will be required to continue the downward push in the cost of energy. Standard power ratings for land based turbines are expected to push to more than 3 MW in the next few years, and the offshore turbines are expected to be 5 MW or greater.

For the wind turbines and ship propulsion motors to evolve to higher power ratings, conventional approaches increase the direct-drive generator diameter or axial (stack) length. Increasing the diameter is preferred from a purely generator electromagnetic perspective, but is not attractive from the transportation, frame, and assembly perspective, especially for land-based turbines. Increasing the axial length of the generators, while maintaining the diameter to be less than approximately 4.1-4.3 meters, alleviates the land-based transportation issue, but results in complex and costly frame structures with long axial extents which presents a problem in that there is a limited amount of space available on board a ship. Also this also presents a problem of increased weight that reduces the efficiency of the motor in propelling a ship.

It is therefore desirable to provide cost-effective electrical machines of increased power ratings and reduced diameters.

BRIEF DESCRIPTION OF THE INVENTION

In accordance with another embodiment of the present invention, a ship propulsion motor is provided. The ship propulsion motor includes at lease two concentric air gaps. The motor comprises at least one double-sided rotor with an inner rotor side and an outer rotor side, and at least one stator with an inner stator core and an outer stator core. The at least one double-sided rotor is concentrically disposed between the inner stator core and the outer stator core.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

The present invention includes different embodiments for double-sided generators and motors that are particularly useful for direct-drive wind turbines and ship propulsion units. Additionally these embodiments may be beneficial for some geared electrical machines. The different configurations described herein below are based upon a double-sided radial-flux, synchronous electrical machines. Although permanent magnet (PM) machines are described and shown for purposes of illustration, other electrical machines such as wound field machines can alternatively be used. These configurations contribute towards achieving cost-effective wind turbines of increased power ratings (>2.0 MW) and are especially advantageous for land-based applications where the outside diameter may be constrained by transportation limitations.

Figure 1:
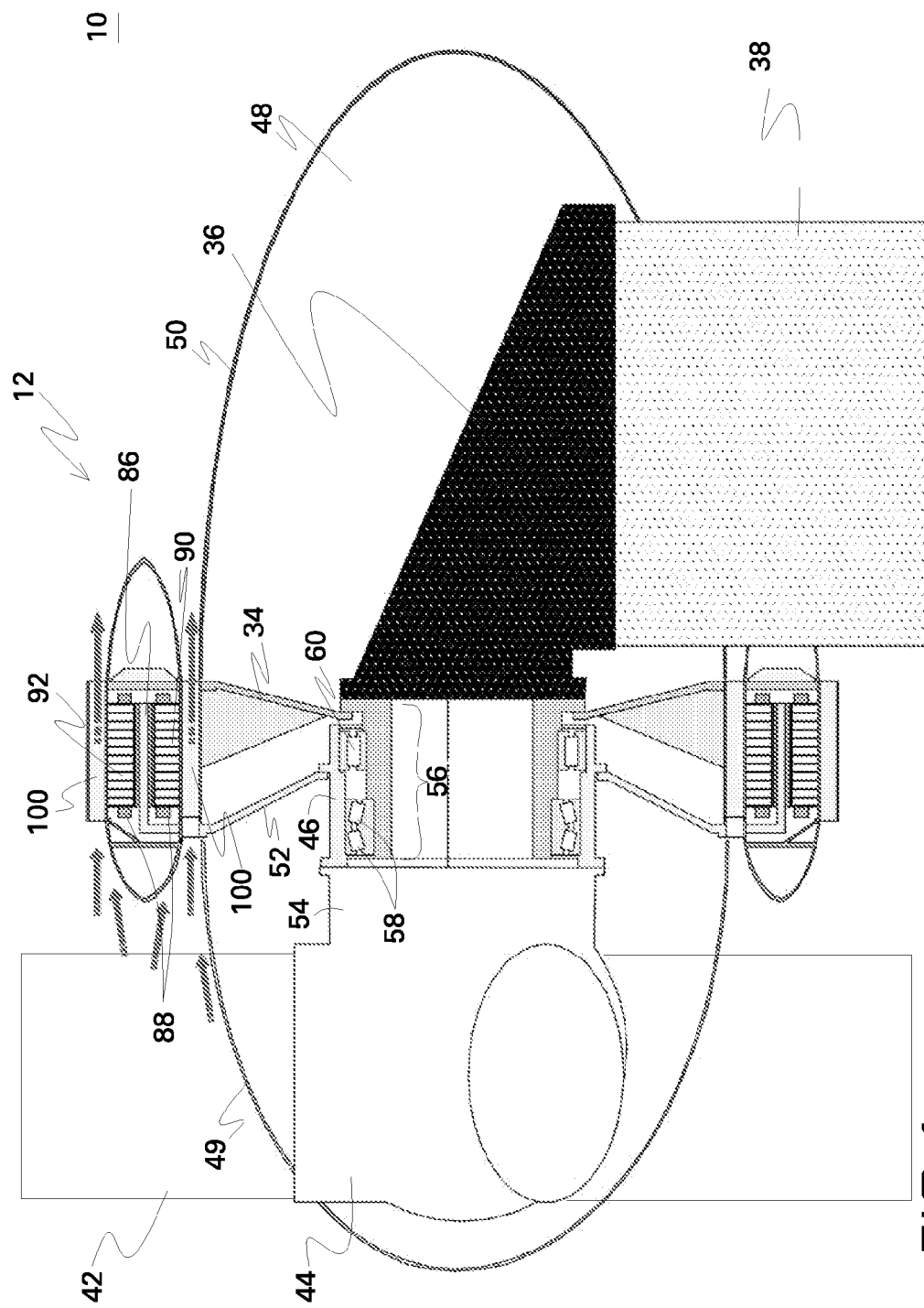
FIG. 1 illustrates a sectional view of a wind turbine comprising an exemplary double-sided generator.

Turning now to the figures, FIG. 1 is a diagrammatic representation of a sectional view of a wind turbine 10 with an exemplary embodiment of a direct-drive double-sided PM generator 12. The PM generator 12 of the wind turbine 10 includes at least two concentric air gaps (not shown in FIG. 1 and discussed later in reference to FIG. 2), thereby effectively converting the PM generator 12 into two concentric generators. Thus, it would be appreciated by those skilled in the art that for the same total envelope defined by the outside diameter and the axial length, the PM generator 12 can produce considerably more power output than a single-sided generator. In practice, thus a 2 MW single-sided generator might be replaced by a double-sided generator capable of producing 3-3.6 MW for the same total diameter and axial length. Equivalently, a 3 MW single-sided PM generator having a diameter of 6 meters might be replaced with a double-sided generator of the same axial length with only 4.3 meters diameter, thereby enabling land-transportation of the entire generator as one unit.

One exemplary embodiment of the wind turbine 10, as shown in FIG. 1 includes a double-sided rotor 86 and a stator 88 in the PM generator 12. Stator 88 includes an inner stator core 90 and the outer stator core 92 and these contribute to the at least two concentric air gaps (shown in subsequent figures). Stator 88 is concentrically mounted within the stationary frame 34. The PM generator 12 further includes, in one example, a cooling channel 100 for cooling the inner stator core 90 and the outer stator core 92. In operation, the power output of the stator 88 is fed and controlled by a power converter unit (not shown) capable of full power conversion. The stator 88 is connected to a stationary frame 34, which is further mounted to a main frame 36. The main frame is further mounted to a tower 38 through a conventional yaw bearing and gear drive system (not shown). In a more specific example, cooling channels 100 use wind for cooling the inner stator core 90 and the outer stator core 92.

The wind turbine 10 as shown in FIG. 1, also includes rotor blades 42 connected to a rotor blade hub 44 which has a rotor hub cover 49. The rotor blade hub 44 connects to the double-sided rotor 86 (which comprises a generator rotor) through a rotor shaft 46. Double-sided rotor 86 is connected to a rotating frame 52. Double-sided rotor 86 also attaches to a stationary hub 56. A nacelle cover 50 typically protects the components inside the nacelle 48. Rotor blade hub 44 is further mounted to a flange 54 on the main rotating shaft 46 (rotor shaft) of a main stationary hub and bearing assembly 56. This assembly 56 connects the rotor blade hub 44 to the main frame 36. Although two main bearings, front main bearing 58 and rear main bearing 60, are illustrated, alternative bearings configurations, including a single main bearing, are possible. Access to the rotor blade hub 44 is obtained through either access ports in the rotating and stationary frames (i.e., between the PM generator 12 and the main bearing assembly 56), or optionally through the main shaft and bearing assembly 56. It will be appreciated by those skilled in the art, that the main bearing and shaft diameters may be sized accordingly with the means for hub access; e.g., larger-diameter main bearings (about 1.5 meters or more outside diameter, for example) would facilitate hub access. The use of lower-cost small diameter bearings less than or equal to about 1.0 meters, for example, would likely require hub access through access port(s).

Assembly of the wind turbine 10 at the installation site is typically done by first lifting the main frame 36, followed by the PM generator 12 (including the main shaft and bearing assembly 56), followed by the turbine rotor hub 44 and blades 42. The nacelle cover 50 is installed as a last step, or as part of the mainframe 36.

Figure 2:
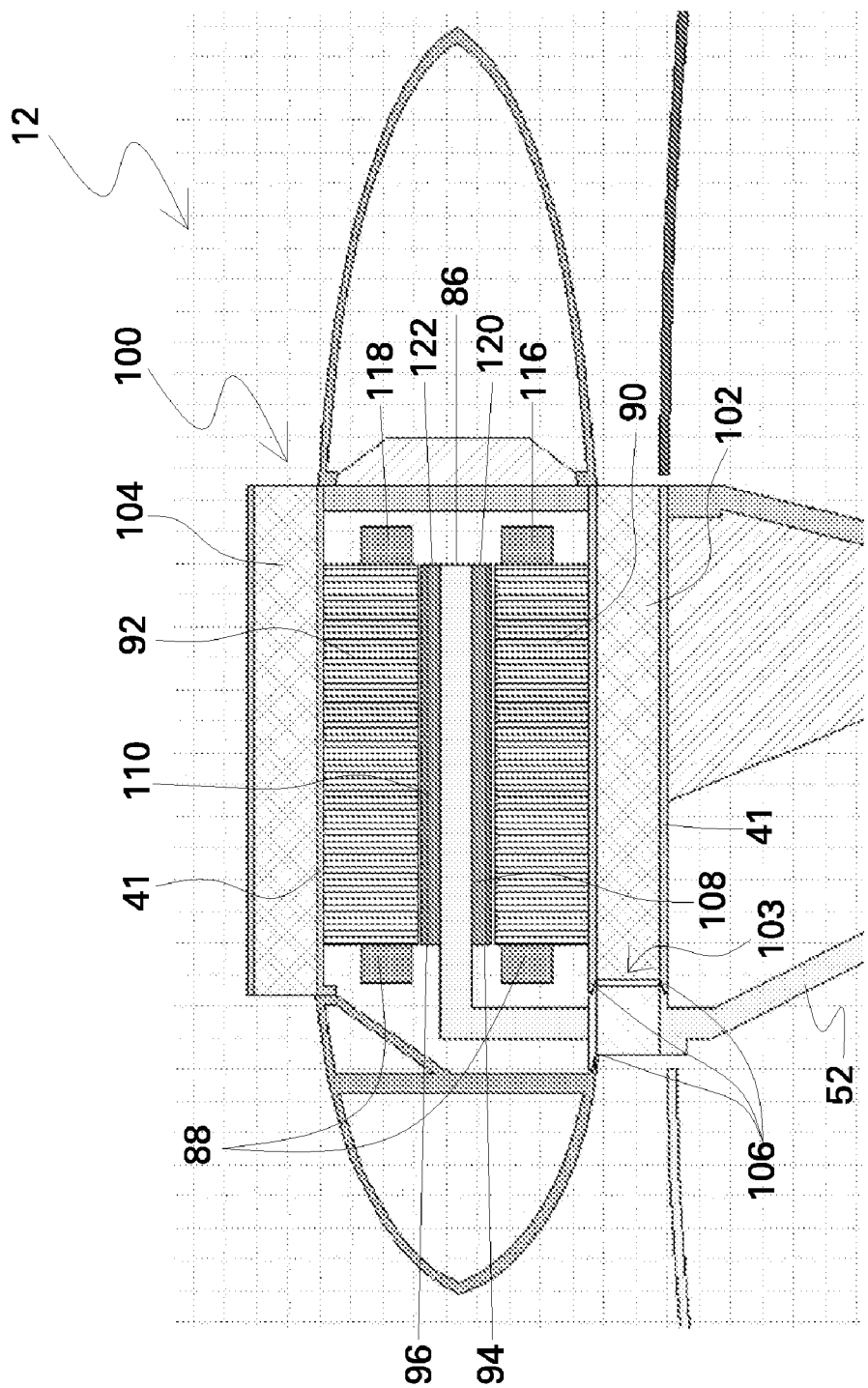
FIG. 2 illustrates a sectional view of the exemplary generator of FIG. 1 with a double-sided rotor and a stator.

FIG. 2 is a detailed view of the PM generator 12 of FIG. 1. FIG. 2 illustrates the PM generator 12 having the rotor 86 with an inner rotor side 108 and an outer rotor side 110 with the respective permanent magnets 120 and 122, and stator 88 having an inner stator core 90 and an outer stator core 92 with their respective windings, inner stator winding 116 and outer stator winding 118. As illustrated, the inner stator core and the outer stator core contribute towards two concentric air gaps 94 and 96. Also, it would be appreciated by those skilled in the art that a portion of magnetic flux can be beneficially shared between the inner rotor side 108 and the outer rotor side 110 of FIG. 2. FIG. 2 also illustrates cooling channels 100 which in one example, may comprise a first cooling channel 102 passing through an air passage channel 103 in the rotating frame 52, and a second cooling channel 104. As it would be appreciated by those skilled in the art, the cooling channels 102 and/or 104 may also optionally function as the stator core support 41. Thus in a specific example, the first cooling channel 102 enables the wind-blown cooling air to flow through the cooling channel 102 forming the stator core support 41.

Labyrinth seals 106 may be provided between the air passage channel 103 in rotating frame 52 and the inner cooling channel 102 to provide protection from the environment to the PM generator 12 and also the frame elements. For additional protection from the environment, the PM generator compartment may be pressurized using filtered air.

Figure 3:
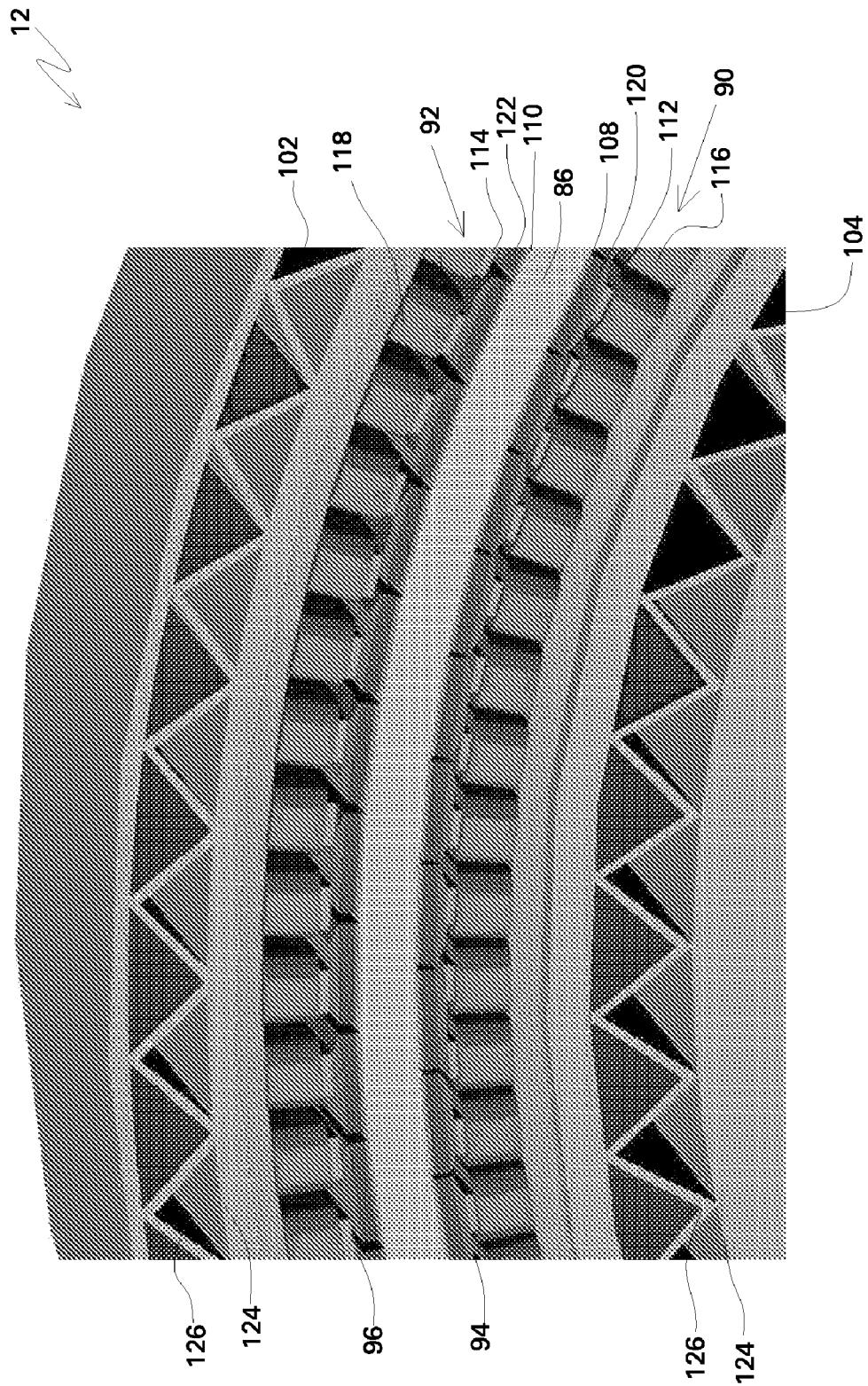
FIG. 3 illustrates a three-dimensional view of the double-sided rotor and stator of FIG. 2.

In the detailed view as shown in FIG. 3, the rotor 86 is shown concentrically disposed between the inner stator core 90 and the outer stator core 92. The outer stator core 92 is inverted with respect to the inner stator core 90, i.e., the air gap surface 96 of the outer stator core 92 faces inwards, while the air gap surface 94 of the inner stator core 90 faces outward. The inner stator core 90 and the outer stator core 92 comprise a respective core stack of laminations 112, 114 as shown in FIG. 3. Stator 88 further includes a plurality of stator windings 116, 118 inserted in slots formed between a plurality of teeth of the inner stator core 90 and the outer stator core 92. The PM generator 12 also includes permanent magnets 120, 122 associated with the inner rotor side 108 and the outer rotor side 110 and disposed proximal to the inner stator core 90 and the outer stator core 92 respectively. In one example, as illustrated in FIG. 3, the permanent magnets 120 and 122 associated with each side of the double-sided rotor may be angularly shifted, i.e. these can be configured to be offset, to significantly reduce the net torque pulsation caused by cogging and winding harmonics with only a small reduction in the torque capability of the generator. Alternatively, the permanent magnets 120 and 122 can be angularly aligned and of the magnetization orientation such that magnetic flux flows radially through the rotor core between the inner and outer magnets, thereby creating nearly balanced electromagnetic radial forces in the air gaps and also potentially reducing the amount of rotor core thickness required for structural reasons.

Cooling channels as shown in FIG. 3, in one example, compromise concentric rings 124 of a metallic material. The metallic material, in one example is at least one of steel or aluminum-alloy. Other non-limiting examples for the metallic material include magnesium, titanium, ductile iron, white iron, or grey iron. Carbon fiber may also be used for the concentric rings 124. It will also be appreciated by those skilled in the art that the metallic material may be fabricated as a cast material, a formed material, a machined material, or as different discrete pieces.

Cooling channels, in a specific example, further include angled fins 126 disposed between the concentric rings 124. In a more specific example, the angled fins 126 are of the same material as the concentric rings and are inserted and welded between the concentric rings. The angled fins 126 may be extruded angle steel bars. Heat is transferred from the inner stator core 90 and the outer stator core 92 (and respective stator windings) through a respective adjacent ring and then to the angled fins 126. Alternatively, the angled fins 126 and the concentric rings 124 may be fabricated via casting. In addition to providing heat transfer to the flowing ambient air, the angled fins 126 also provide excellent stiffness in radial, circumferential, and axial directions, much like a lightweight honeycomb construction. Thus the thickness of the concentric rings 124 may be made substantially thinner and lighter than a single ring for the frame. Furthermore, the stiffness of the cooling channels also reduces deflection (and thereby reduces vibration and noise) caused by the traveling electromagnetic forces in the air gap. In another specific example, cooling channels 100 include radially oriented fins (not shown) extended between the concentric rings 124.

Figure 4:
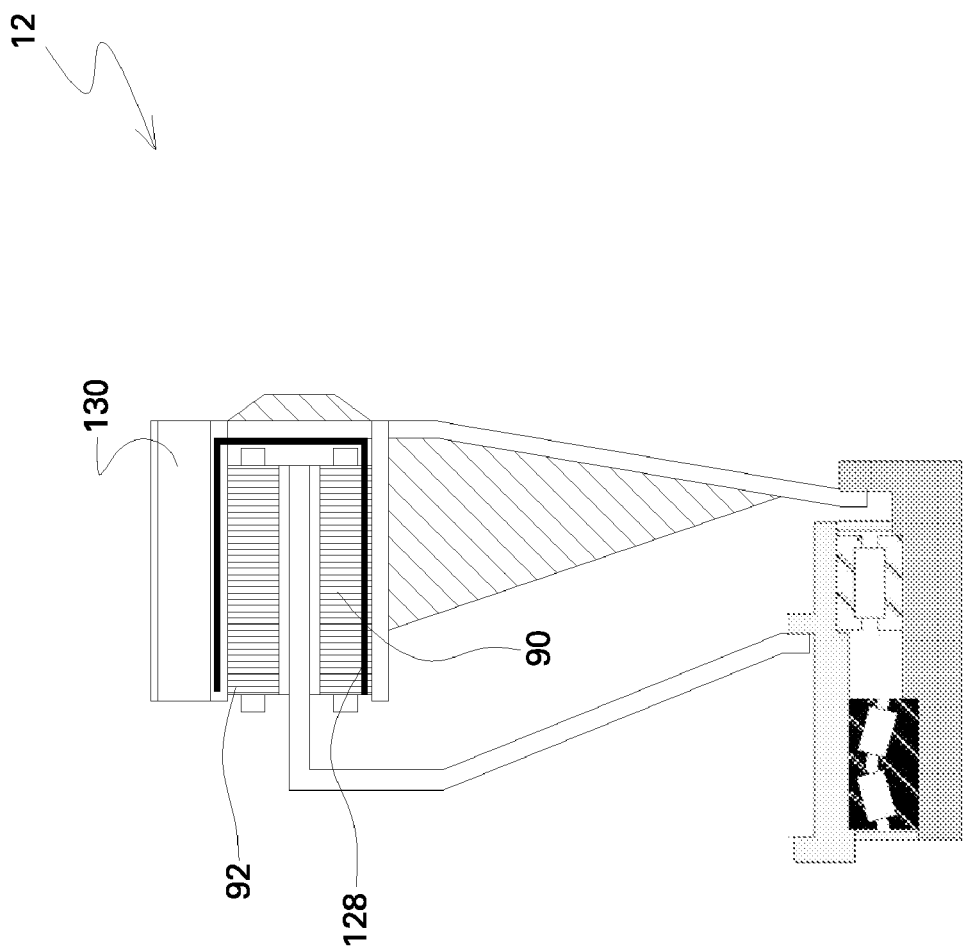
FIG. 4 illustrates an exemplary embodiment with a heat pipe and an outer cooling channel in the arrangement of FIG. 2.

In another exemplary embodiment, as shown in FIG. 4, the PM generator 12 further includes a heat pipe 128, generally within or surrounding the inner stator core 90 and the outer stator core 92, and a cooling channel 130 disposed generally adjacent to the outer stator core 92. Heat pipe 128 transfers heat from the inner stator core to the cooling channel 130. Heat pipe 128 may be embedded in the core or at the slot bottoms of the inner stator core 90 for efficiently transfer heat from the PM generator 12 to cooling channel 130. The primary advantage of this arrangement is that the ducting and sealing required for wind cooling is less complex, and the plumbing, pumps, heat exchanger, and liquid reservoirs required by liquid cooling are eliminated. It will be well appreciated by those skilled in the art that alternative cooling methods are also possible like liquid cooling.

The double-sided generator 12 as described in different embodiments hereinabove, offers several advantages over single-sided generators for wind turbines. The most significant advantages include a reduction in frame mass for a given power rating, and/or alternatively an increased power rating with a generator that fits within a given transportation envelope or has a more streamlined design. Additional advantages include for example, the embodiment with the double-sided rotor enables sharing of the magnetic flux paths between the two generator rotor sides. This enables the net active material requirements, and hence mass and cost, of the rotor yoke to be potentially reduced. Furthermore, the radial magnetic forces in the two concentric air gaps act in opposing directions, thereby canceling or at least greatly reducing the net radial magnetic force at each circumferential position along the gap. This reduces the radial deflection of the rotor, and also reduces vibration and noise.

Figure 5:
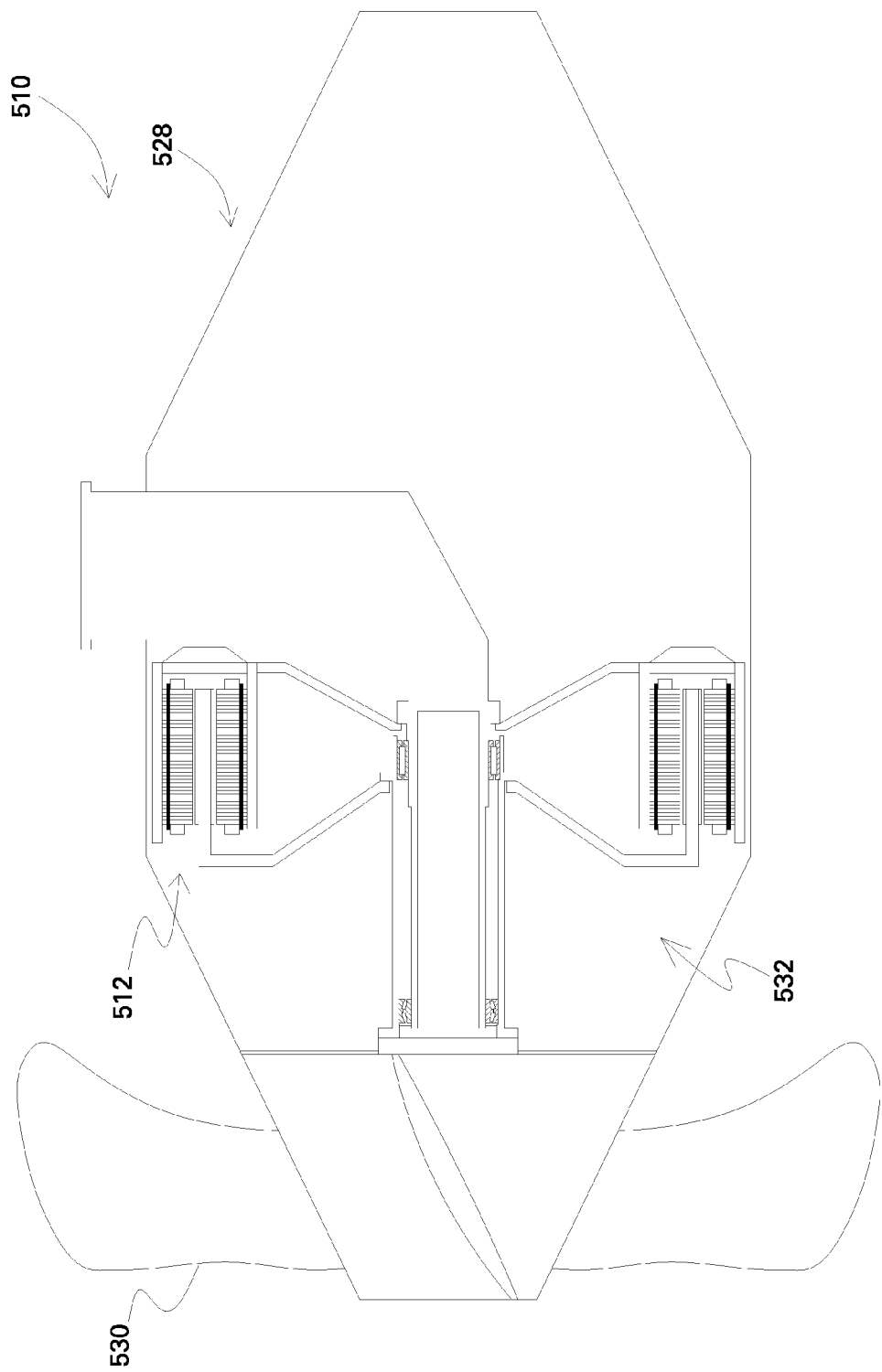
FIG. 5 illustrates a sectional view of a portion of a ship comprising an exemplary double-sided ship propulsion motor.
Figure 6:
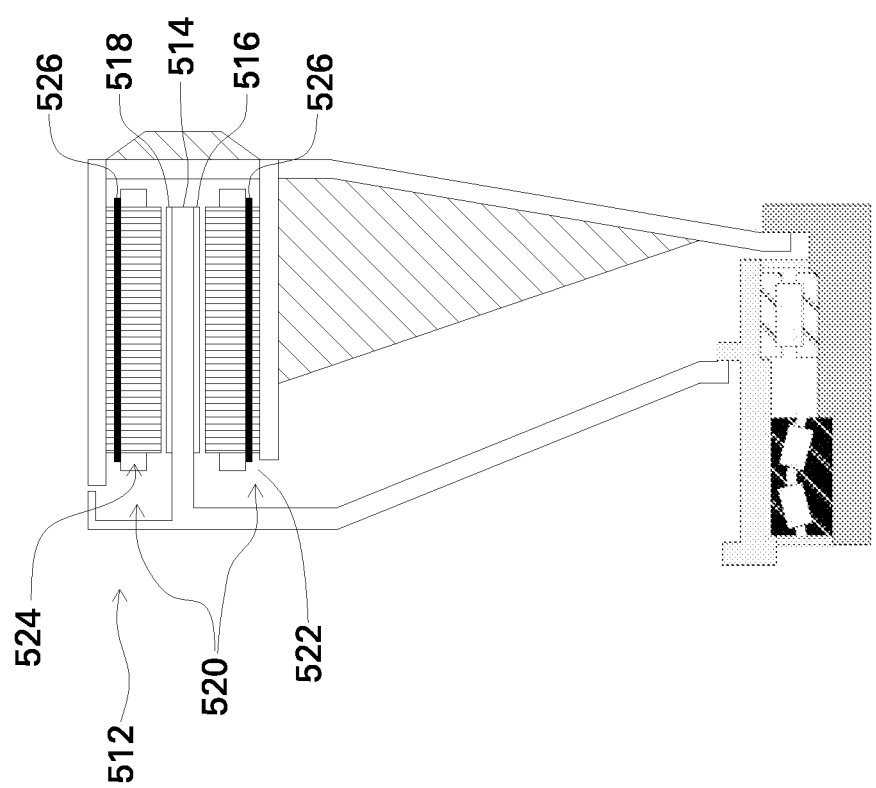
FIG. 6 illustrates a section view of the exemplary motor of FIG. 5.

Although embodiments of the present invention have been described primarily in terms of wind turbines, the concepts are additionally useful in other applications with one example being ship propulsion motors. FIG. 5 illustrates a sectional view of a portion of a ship 510 comprising an exemplary double-sided ship propulsion motor 512, a propeller 530, a mounting and bearing assembly 532, and a frame assembly 528. FIG. 6 illustrates a sectional view of the exemplary motor of FIG. 5 wherein the ship propulsion motor 512 comprises at least one double-sided rotor 514 with an inner rotor side 516 and an outer rotor side 518 and at least one stator 520 with an inner stator core 522 and an outer stator core 524, wherein the at least one double-sided rotor is concentrically disposed between the inner stator core and the outer stator core of the ship propulsion motor. Many of the specific rotor construction details are similar to the wind turbine embodiments and are not repeated here. FIG. 6 further illustrates at least one cooling channel 526 for cooling the inner stator core and the outer stator core. In a typical ship propulsion embodiment, cooling channel 526 uses liquid for cooling the stator core. The liquid used is typically at least one of water-glycol and de-ionized water, but any other liquid commonly used for cooling of electric machines may be used. Cooling channel 526 typically comprises a material selected from a group consisting of aluminum, copper, stainless steel and any combination thereof and may use any other material commonly used for cooling of electric machines. A heat exchanger (not shown) may be used to transfer the heat absorbed in the cooling liquid to the ambient air. Such cooling channels of FIG. 6 can also be used in the wind turbine embodiments.

In the present embodiment, the ship propulsion motor 512 is capable of generating approximately 7,000 horsepower (9,387 Kilowatts) based on an input of approximately five megawatts of input power. For larger applications, e.g., a NAVY ship requiring a motor that generates about 25,000 horsepower (33,506 Kilowatts) or more, an input power of approximately 18.5 megawatts may be required. For the applications where multiple motors 512 are employed, an operational mounting of the motors in a counter rotating arrangement is also contemplated in this embodiment.

Figure 7:
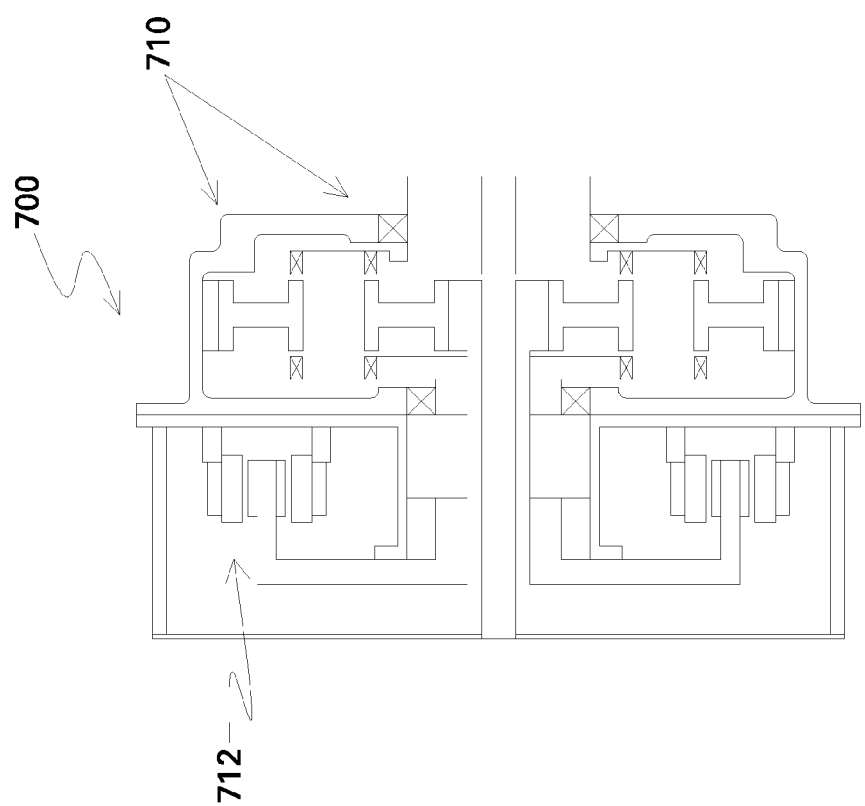
FIG. 7 illustrates an exemplary embodiment with the gear box used with the double-sided generator of FIG. 2.

In several applications, as it will be well appreciated by those skilled in the art, a medium speed electrical machine with a gear box may be used for motoring and generating applications. A medium speed generator is one that rotates with a speed between approximately 150 and 1000 rpm. For example, a medium speed generator connected to a gear box with a gear ratio of approximately 10:1 offers potential for wind generators. In such an application it may be desirable to minimize the volume of the gear box and to have a streamlined drive train (assembly including generator and gear box) with low frontal cross section. FIG. 7 illustrates a diagrammatic view of an exemplary electrical machine 700 with the double-sided generator as described in the different embodiments for wind turbine hereinabove, along with a gear box 710. In a specific example, the diameter of the generator 712 matches the diameter of the gear box 710. Typically, for gear ratios less than approximately ten (which could use a simple epicyclic gear configuration), an optimally sized generator diameter for a megawatt wind generator would be significantly larger that the diameter of the gear box. For example the optimal outside diameter of a 2.5 MW wind generator attached to a 8:1 gear box is 2.7 meters, while the 8:1 gear box diameter is less than 2 meters. By utilizing a double-sided generator the outside diameter of the generator can be made to match the outside diameter of the gear box with out a substantial increase in mass of the double-sided generator as compared to an optimally sized direct drive generator. Those skilled in the art will recognize that the above technique has significant advantages over the single sided generators with gear boxes. In order to streamline the design with a single sided generator, the generator diameter would have to be reduced to match the gear box, and consequently the axial length would be increased in inverse proportion to the square of the ratio the optimal diameter to the machine diameter that which matches the gear box. Such a single sided machine would be much heavier and more expensive than an equivalent double-sided machine.

While only certain features of the invention have been illustrated and described herein, many modifications and changes will occur to those skilled in the art. It is, therefore, to be understood that the appended claims are intended to cover all such modifications and changes as fall within the true spirit of the invention.

What is claimed is:

1. At least one ship propulsion motor comprising:
   at least one double-sided rotor with an inner rotor side comprising a plurality of first permanent magnets and an outer rotor side comprising a plurality of second permanent magnets;
   at least one stator with an inner stator core comprising a plurality of inner stator windings and an outer stator core comprising a plurality of outer stator windings, wherein the at least one double-sided rotor is concentrically disposed between the inner stator core and the outer stator core of the ship propulsion motor and wherein the inner stator core and the inner rotor side are located to oppose each other with a first air gap disposed therebetween and wherein the outer rotor side and the outer stator core are located to oppose each other with a second air gap disposed therebetween and the first and second air gaps being concentric, wherein radial magnetic forces of said first and second permanent magnets in said concentric air gaps acting in opposing directions;

at least one cooling channel for cooling each of the inner stator core and the outer stator core, said cooling channel comprising a plurality of concentric rings including at least one set of alternately angled fins disposed between said plurality of concentric rings said fins forming triangular channels between corresponding concentric rings; and a heat pipe surrounding the inner stator core and the outer stator core configured for heat transfer from the inner stator core to said at least one cooling channel;

wherein the at least one double-sided rotor and the at least one stator cooperate to produce at least 7,000 horsepower (9,387 Kilowatts).

2. The at least one ship propulsion motor of claim 1 wherein the ship propulsion motor comprises a direct-drive motor.

3. The at least one ship propulsion motor of claim 2 wherein the at least one stator is concentrically mounted within a stationary frame.

4. The at least one ship propulsion motor of claim 1 wherein the at least one cooling channel uses liquid for cooling the inner stator core and the outer stator core.

5. The at least one ship propulsion motor of claim 1 wherein at least one of the first and second permanent magnets are configured to be offset to reduce net torque pulsation.

6. The at least one ship propulsion motor of claim 1 wherein at least one of the first and second permanent magnets are configured to be aligned.

7. The at least one ship propulsion motor of claim 1 wherein at least a portion of magnetic flux of said first and second permanent magnets is shared between the at least two concentric motor rotor sides.

8. The at least one ship propulsion motor of claim 1, further comprising a plurality of ship propulsion motors provided in a counter rotating arrangement.

9. The at least one ship propulsion motor of claim 1, wherein the at least one rotor and at least one double-sided stator cooperate to produce at least 25,000 horsepower (33,506 Kilowatts).

* * * * *

UNITED STATES PATENT AND TRADEMARK OFFICE
CERTIFICATE OF CORRECTION

Page 1 of 1

PATENT NO. : 7,830,063 B2
APPLICATION NO. : 11/559505
DATED : November 9, 2010
INVENTOR(S) : Jansen et al.

It is certified that error appears in the above-identified patent and that said Letters Patent is hereby corrected as shown below:

In Column 2, Line 10, delete "lease" and insert -- least --, therefor.

In Column 2, Line 48, delete "double-sided" and insert -- double-sided, --, therefor.

In Column 2, Line 66, after "and" delete "the".

In Column 4, Line 45, delete "compromise" and insert -- comprise --, therefor.

In Column 4, Line 63, delete "the concentric" and insert -- concentric --, therefor.

In Column 5, Line 7, delete "extended" and insert -- extending --, therefor.

In Column 5, Line 13, delete "core" and insert -- core 90 --, therefor.

Signed and Sealed this
Eighth Day of March, 2011

David J. Kappos
*Director of the United States Patent and Trademark Office*